US006208853B1

United States Patent
LoVasco et al.

(10) Patent No.: US 6,208,853 B1
(45) Date of Patent: *Mar. 27, 2001

(54) METHODS FOR REGISTERING A WARRANTY FOR A WIRELESS DEVICE

(75) Inventors: Francis LoVasco, Roxbury Township, County of Morris; Clifford L. Sayre, III, Monmouth, both of NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/030,450

(22) Filed: Feb. 24, 1998

(51) Int. Cl.[7] ........................................ H04M 3/42
(52) U.S. Cl. ........................ 455/414; 455/435; 455/466
(58) Field of Search .................... 455/405, 406, 455/407, 408, 409, 418, 414, 419, 466, 412, 433, 435, 575, 420, 410

(56) References Cited

U.S. PATENT DOCUMENTS

| | | | |
|---|---|---|---|
| 5,418,837 | * | 5/1995 | Johansson et al. ............... 379/58 |
| 5,448,633 | * | 9/1995 | Jamaleddin et al. ............ 379/201 |
| 5,557,605 | * | 9/1996 | Grube et al. .................... 455/415 |
| 5,673,306 | * | 9/1997 | Amadon et al. ................. 455/409 |
| 5,845,203 | * | 12/1998 | LaDue ............................. 455/414 |
| 5,867,714 | * | 2/1999 | Todd et al. ...................... 395/712 |
| 5,887,249 | * | 3/1999 | Schmid ........................... 455/411 |
| 5,894,596 | * | 4/1999 | Hayes, Jr. ....................... 455/418 |
| 5,930,239 | * | 7/1999 | Turcotte .......................... 370/310 |
| 6,041,229 | * | 3/1999 | Turner ............................. 455/420 |

* cited by examiner

Primary Examiner—William G. Trost
Assistant Examiner—Joy K. Redmon
(74) Attorney, Agent, or Firm—Fish & Neave; Robert R. Jackson; Walter M. Egbert, III (57) ABSTRACT

A warranty registration method for a wireless remote unit in a communication network is provided wherein the communication network includes a wireless network and a message center. Initial activation of a wireless remote unit prompts retrieval of warranty information specific to the wireless remote unit. A message is constructed based on the warranty information and subsequently transmitted to the message center. The message center receives the warranty information and transfers it to a warranty center.

21 Claims, 6 Drawing Sheets

METHODS FOR REGISTERING A WARRANTY FOR A WIRELESS DEVICE

BACKGROUND OF THE INVENTION

This invention relates to techniques for registering the warranty of a wireless remote unit in a communication network. More particularly, this invention relates to methods for a user of the wireless remote unit to register with a warranty center by utilizing a wireless-specific transmission medium.

Warranty registration is often ignored by the purchasers of warranted products because of the tedious process of completing a warranty form with various required information and mailing in the completed form. Even the purchasers of electronic products which may carry a fairly certain anticipation of repair needs in the near future avoid submitting the warranty registration until actual breakdowns. This causes disruption to the manufacturers of products because the manufactures may not be able to accurately estimate the costs related to the repairs covered under the warranty.

Due to the recent increase in the number of personal computers that are equipped with modem capability, the process for registering a warranty has been dramatically automated. The purchasers of new personal computers are requested in its first use to input warranty-related information and, by utilizing the modem, to register with the personal computer manufacturer for warranty service via a telecommunication network.

However, wireless remote units such as cellular telephones have not seen the benefits of such automatic warranty registration processes due to the complexities and difficulties associated with transferring data via a wireless network in contrast to the landline trunks of a public telecommunication network.

Another shortcoming of present-day warranty administration for wireless remote units (e.g., cellular telephones) is the questionable accuracy of the start date of the warranty period. For example, the date information may be missing from the paper warranty form that is submitted. This invention improves upon the current methods by automatically identifying and storing the activation date of the wireless remote unit.

It is therefore an object of the present invention to provide methods for efficiently registering wireless remote units utilizing a wireless transmission medium.

SUMMARY OF THE INVENTION

This and other objects of the invention are accomplished in accordance with the principles of the invention by providing warranty registration methods for a wireless remote unit located in a communication network. The communication network includes a wireless network, a message center and a warranty center.

A warranty registration process may be performed using a message, such as a wireless text message. The registration process involves constructing a wireless text message based on user-specific information that is input by the user in response to a request, and remote-unit-specific information that has been pre-stored in the memory of the remote unit. The text message is subsequently transmitted to the message center and decoded to the warranty information. The warranty information is either stored in a mailbox in the message center or immediately transferred to the warranty center and stored in a warranty database located in the warranty center.

Alternatively, the registration process may be performed using a wireless voice band tone message, such as Dual Tone Multi-Frequency ("DTMF") tones. In this case the registration process involves constructing a voice band tone message based on the warranty information specific to the user and the wireless remote unit. The voice band tone message is transmitted to a voice-interactive device located in the message center which decodes the voice band tone message to the warranty information. The voice-interactive device may also support the wireless remote unit by providing voice instructions that the user of the wireless unit can follow in order to input necessary information. The decoded warranty information is either stored in the voice-interactive device temporarily until a periodic query by the warranty center or transferred to the warranty center immediately after the decoding process.

Further features of the invention, its nature and various advantages will be more apparent from the accompanying drawings and the following detailed description of the preferred embodiments.

BRIEF DESCRIPTION OF THE DRAWINGS

FIGS. 2a–2b are sometimes referred to collectively as FIG. 2.

FIGS. 3a–3c are sometimes referred to collectively as FIG. 3.

DETAILED DESCRIPTION OF THE PREFERRED EMBODIMENTS

Figure 1:
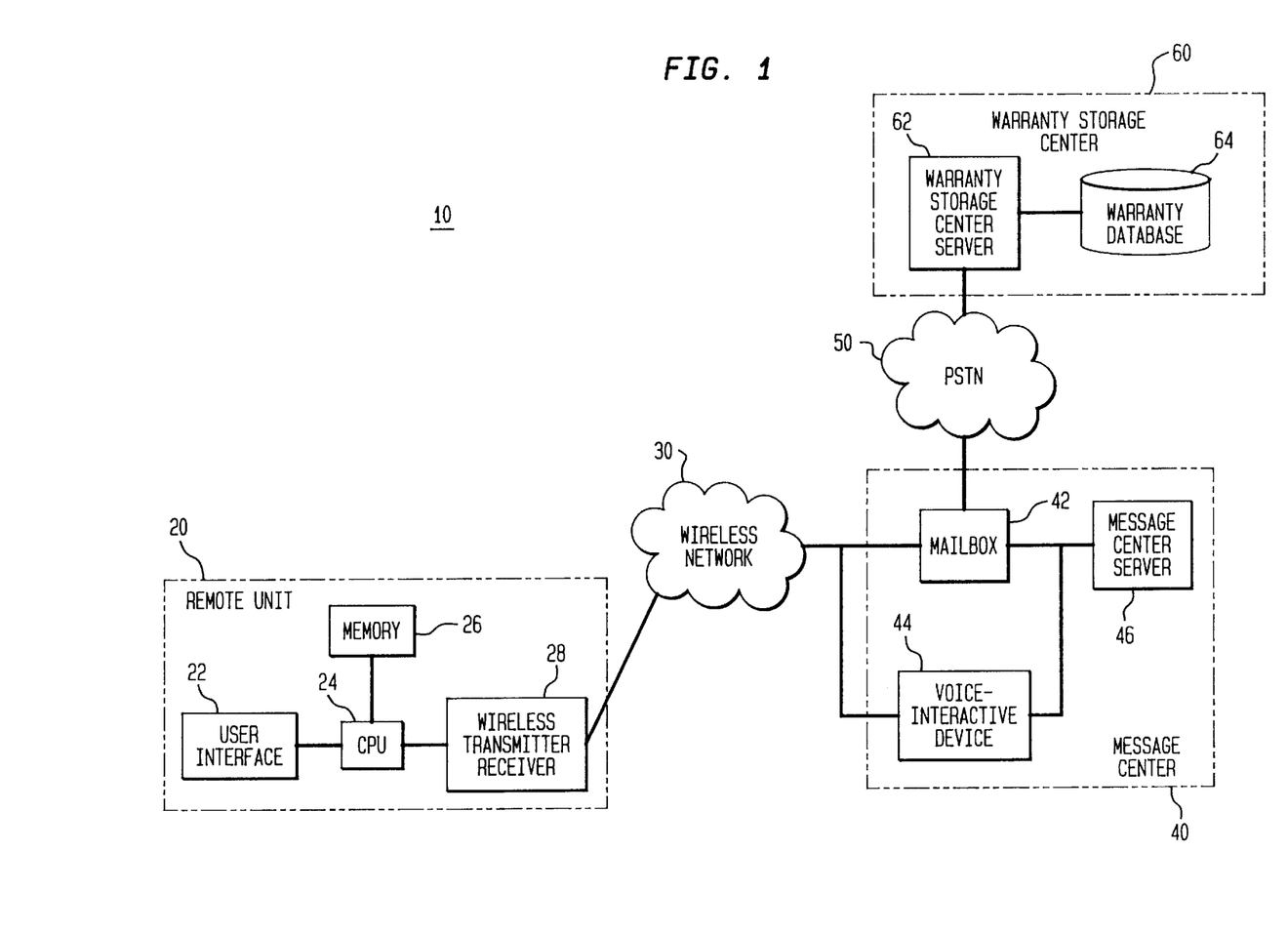
FIG. 1 is a perspective view of a communication network containing a wireless remote unit, wireless network, message center and warranty center in accordance with the present invention.

In accordance with the present invention, communication network 10 includes remote unit 20, wireless network 30, message center 40, public telecommunication network 50 and warranty center 60.

Remote unit 20 can be a cellular phone, pager or any other wireless unit that has access to wireless network 30. Remote unit 20 may include user interface 22, central processor unit 24, memory 26 and wireless transmitter and receiver 28. User interface 22 typically includes a screen, a keypad, a microphone and/or a speaker. Central processor unit 24 executes various wireless protocols to facilitate transmission and receipt of data. More specifically, the network interworking functions of central processor unit 24 encode various information including voice, text, image, data and/or video into a data-versed medium that is transferable via wireless network 30 based on various protocols defined by the communication industry.

For example, a wireless messaging service, called Short Message Service ("SMS"), is extensively used in paging services to transfer alphanumeric text messages from a wireless device to a message center or vice versa. In order to use such a messaging service, central processor unit 24 locates an appropriate protocol and stored information from memory 26 and constructs a message. The SMS capabilities for Code Division Multiple Access ("CDMA") are further defined in the standard TIA/EIA IS-637. The SMS capabilities for Time Division Multiple Access ("TDMA") are further defined in the standard TIA/EIA IS-136. The message service may also be the mobile-originated message capability of a Global System Mobile ("GSM") wireless remote unit. The technology described above can be used in any wireless access technology by making use of the short-message service capability within that technology.

Another example for a transferable medium is Dual Tone Multi-Frequency ("DTMF") tones. The DTMF tones are voice band tones that are used for dialing and conveying control information. In a wireless phone, DTMF tones are used to convey control information to message center 40.

Other examples of information that can be converted into a transferable medium are facsimile images, electronic mail messages and video clips.

Memory 26 stores various data including speed-dial numbers, user-specific functions, protocols and warranty information specific to remote unit 20. The warranty information may include a serial number, model number, product configuration and customer information. Wireless transmitter/receiver 28 transfers data from and to message center 40 via wireless network 30.

Wireless network 30 may include base stations, regional stations, central stations and transmitters that are interconnected by landline trunks and wireless connections.

Message center 40 may include either mailbox 42 or voice-interactive device 44 or both of these units. Specifically, mailbox 42 is capable of receiving and storing SMS messages from remote unit 20 via wireless network 30, while voice-interactive device 44 is capable of receiving and storing DTMF tones from remote unit 20 via wireless network 30. Message center 40 further includes message center server 46 which is connected to mailbox 42 and voice-interactive device 44 for facilitating decoding of SMS messages and/or DTMF tones. Message center server 46 also transfers decoded warranty information to warranty center 60, either periodically or instantaneously upon the receipt of the SMS messages and/or DTMF tones.

Warranty center 60 includes warranty storage center server 62 and warranty database 64. Warranty storage center server 62 is connected to message center server 46 in order to transfer decoded warranty information from either mailbox 42 or voice-interactive device 44 to warranty information database 64. Warranty database 64 may be a set of duplicative storage located in different sites in order to provide reliability in case of natural disasters.

Figure 2A:
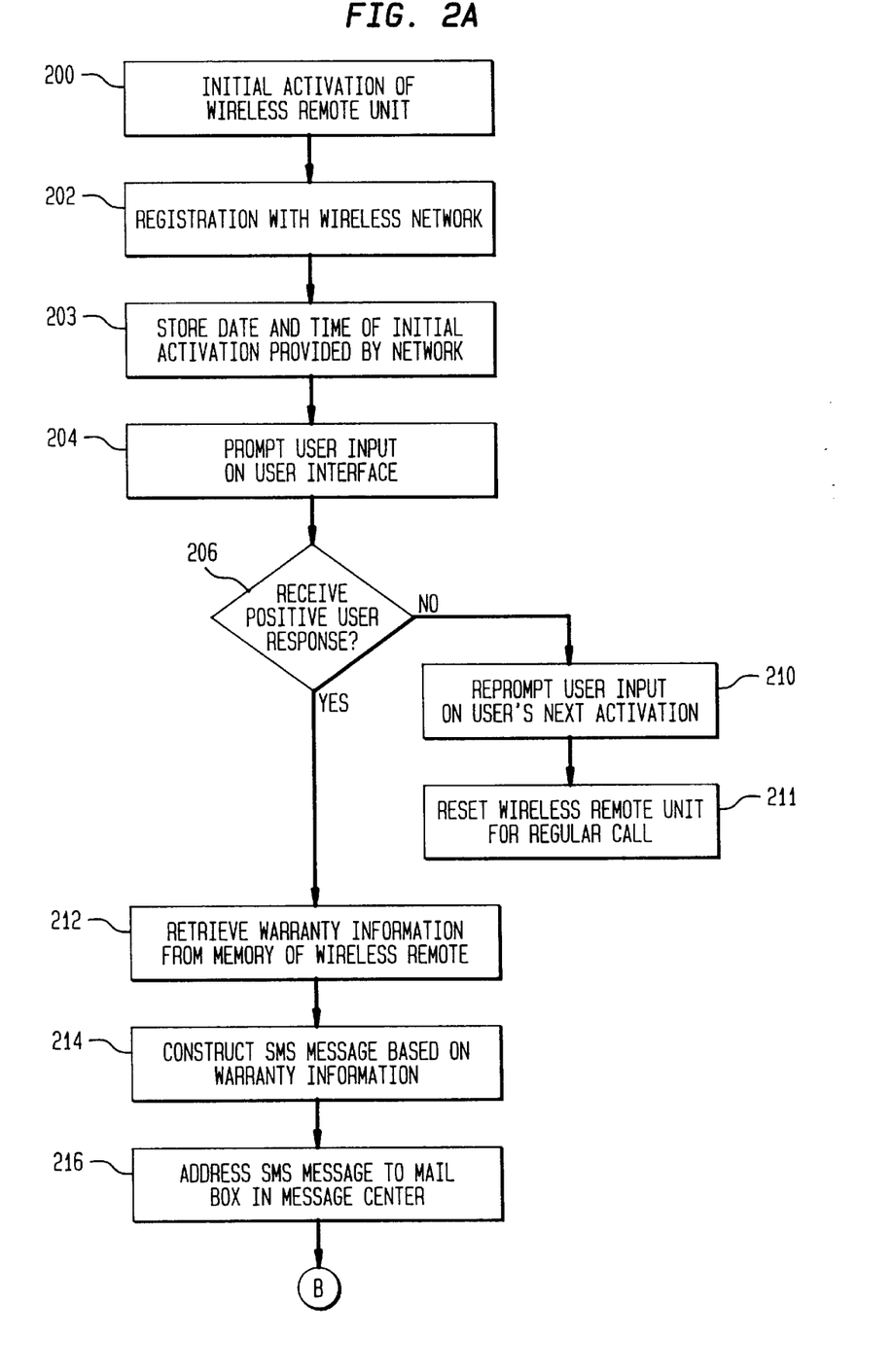
FIGS. 2a–2b are a flow chart of the steps involved in registering a warranty for a wireless device in a preferred embodiment of the methods of this invention.
Figure 2B:
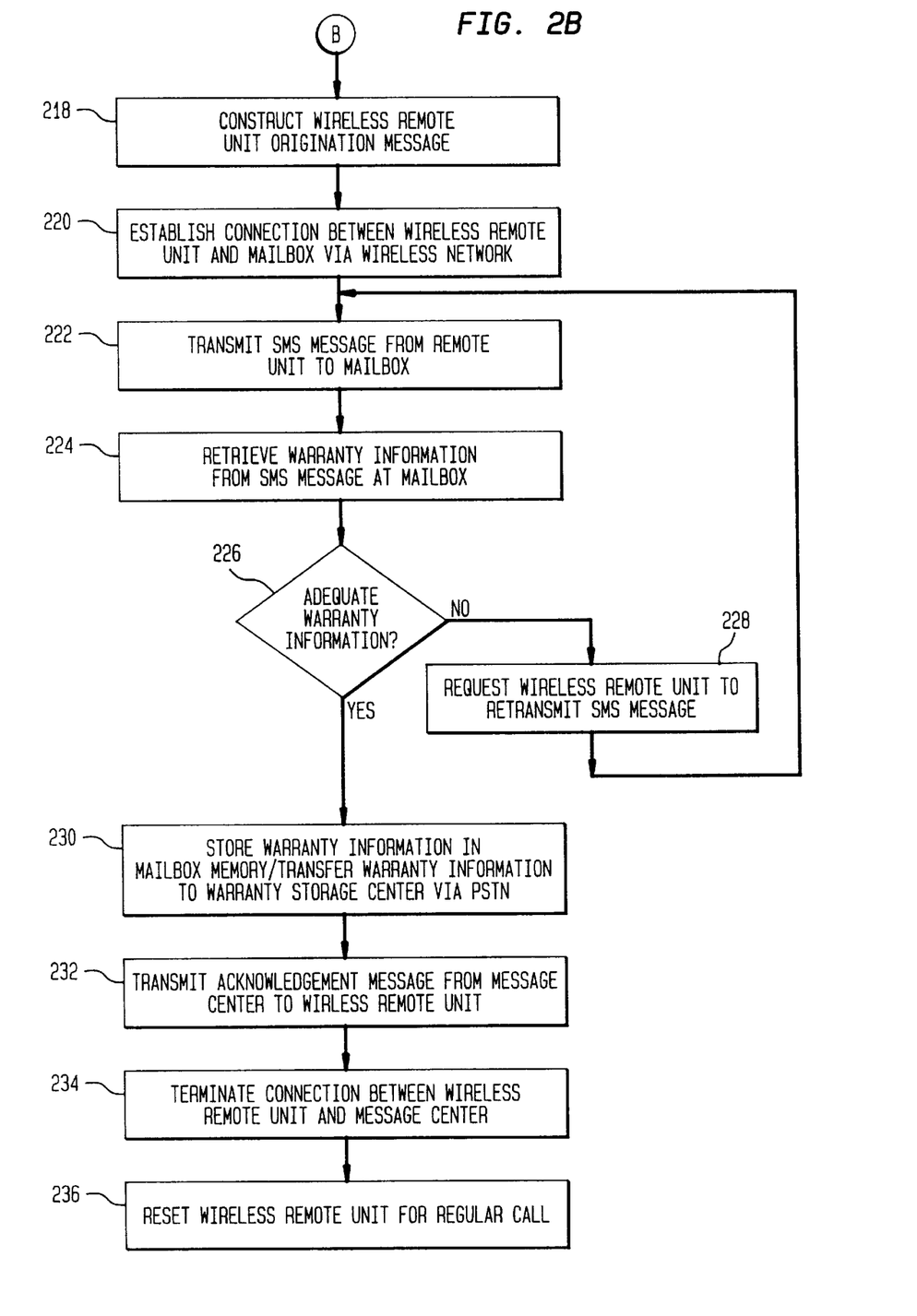

The steps involved in registering a warranty for wireless remote unit 20 using SMS messages is illustrated in FIG. 2. In step 200, central processor unit 24 of remote unit 20 detects activation of remote unit 20 by the user who, for example, presses an on-off key. In step 202, central processor unit 24 transmits a registration message from wireless transmitter/receiver 28 in order to register with wireless network 30.

If this is the initial activation, the wireless remote unit 20 at step 203 will derive the current date and/or time from control channel information of wireless network 30, and then store this value as the initial activation date in memory unit 26. The recordation of the initial activation date in memory 26 prevents prolonging of the warranty period.

In step 204, central processor unit 24 prompts a user input on user interface 22, for example, a Liquid Crystal Display ("LCD") or a speaker. User interface 22 displays or announces a warranty registration request to which the user responds, for example, by simply pressing one key to proceed with the registration process. Alternatively, user interface 22 may ask the user to input the user's name, address, phone number, the date and location of the remote unit 20 purchase, and other ancillary information. This information identifies the user of remote unit 20 and triggers the running of the warranty period. The warranty registration request may also ask the user to provide, on an optional basis, some demographic information including, for example, the frequency of remote unit 20 usage and the type of remote unit 20 usage such as Internet browsing.

In step 206, central processor unit 24 determines whether the user of remote unit 20 has responded positively, i.e., whether proper information has been input in compliance with the warranty information request. If not, central processor unit 24 in step 210 reprompts a user input on the user's next activation of remote unit 20. In step 211, central processor unit 24 configures remote unit 20 for a regular phone call to be made by the user.

If central processor unit 24 determines that the user has responded positively to the warranty registration request, central processor unit 24 in step 212 retrieves the warranty information that is pre-stored in memory 26 at the remote unit's production facility. For example, the pre-stored warranty information may include the serial and model number of remote unit 20, the phone number of the message center and the identification of the designated warranty storage center.

In step 214, central processor unit 24 constructs an SMS message based on the warranty information that is input by the user and retrieved from memory 26. In step 216, central processor unit addresses the SMS message to appropriate mail box 42 in message center 40. In step 218, central processor unit 24 further constructs a wireless origination message containing information that is necessary to establish a wireless connection.

In step 220, remote unit 20 establishes a connection between remote unit 20 and mailbox 42 located in message center 40 via wireless network 30 based on the wireless origination message. In step 222, wireless transmitter/receiver transmits the SMS message to mailbox 42.

In step 224, message center server 46 retrieves the warranty information from the SMS message. Optionally, message center server 46 in step 226 further determines whether the retrieved warranty information is adequate to process a warranty registration. If not, message center server 46 requests remote unit 20 to retransmit the SMS message that contains adequate information.

If it is determined that all necessary information for the warranty registration has been received, message center server 46 in step 230 either stores the warranty information in mailbox 42 or immediately transfers the warranty information to warranty storage center 60 via Public Switch Telephone Network ("PSTN") 50. If the warranty information is stored in mailbox 42, warranty storage center server 62 periodically accesses mailbox 42 to download the recent warranty information to warranty database 64.

In step 232, message center server 46 transmits an acknowledgment message to remote unit 20 confirming that the warranty registration process is complete. Central processor unit 24 in step 234 terminates the connection between remote unit 20 and message center 40. In step 236, central processor unit 24 resets itself for a regular phone call to be made by the user.

The order of the steps in FIG. 2 is not critical. For example step 204 can occur earlier in the process before step 202.

Figure 3A:
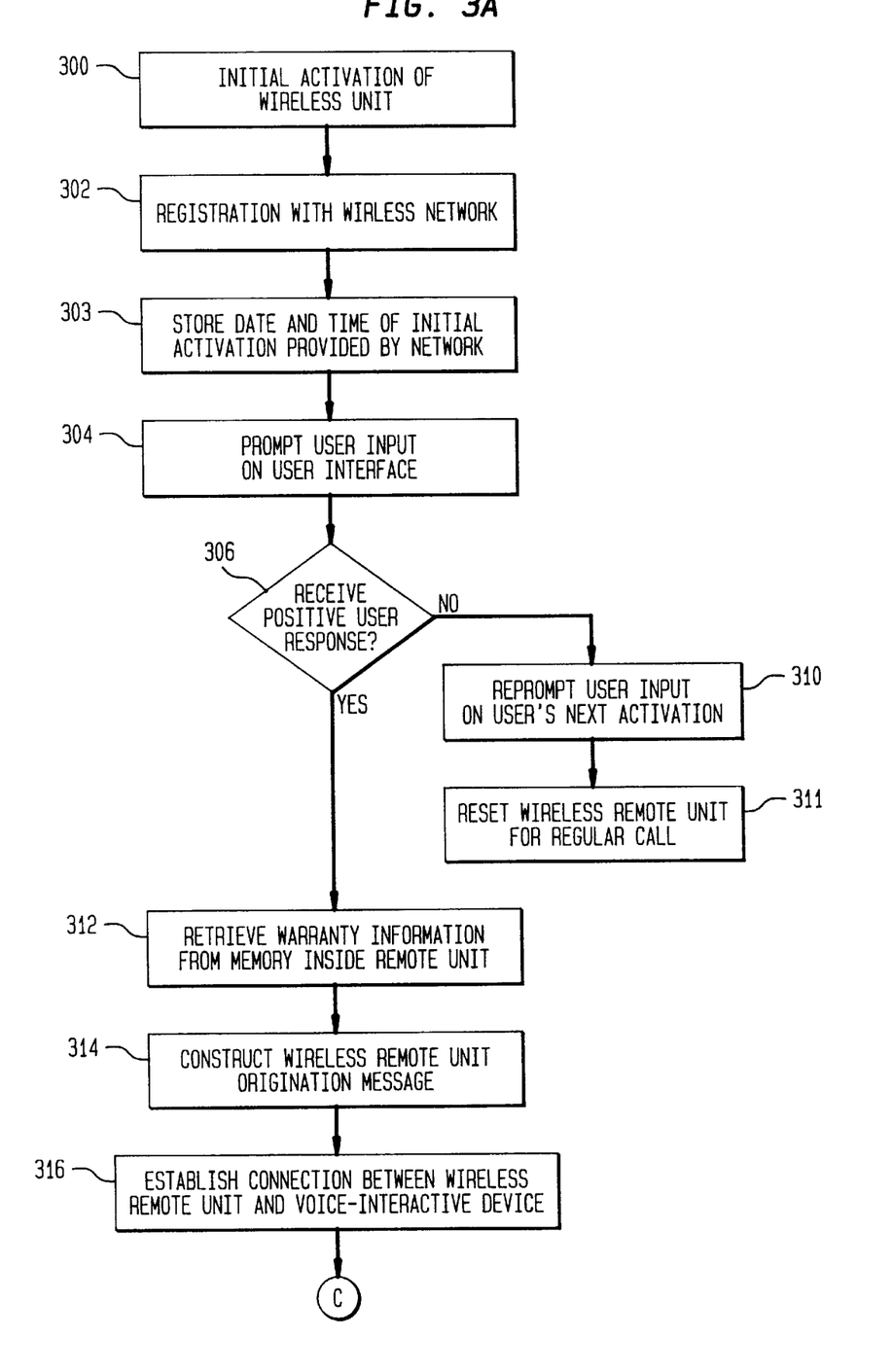
FIGS. 3a–3c are a flow chart of the steps involved in registering a warranty for a wireless device in an alternative embodiment of the methods of the invention.
Figure 3B:
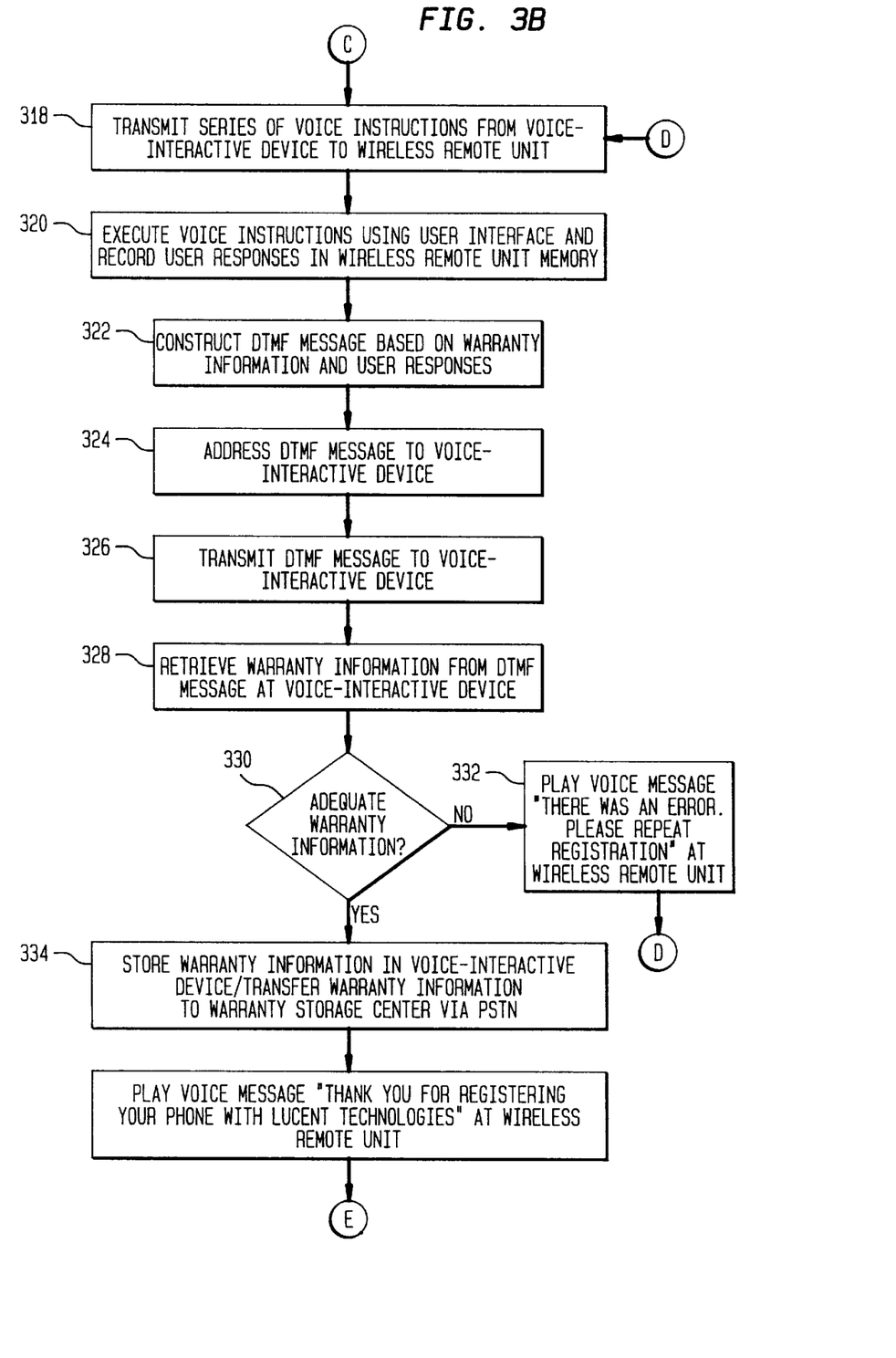
Figure 3C:
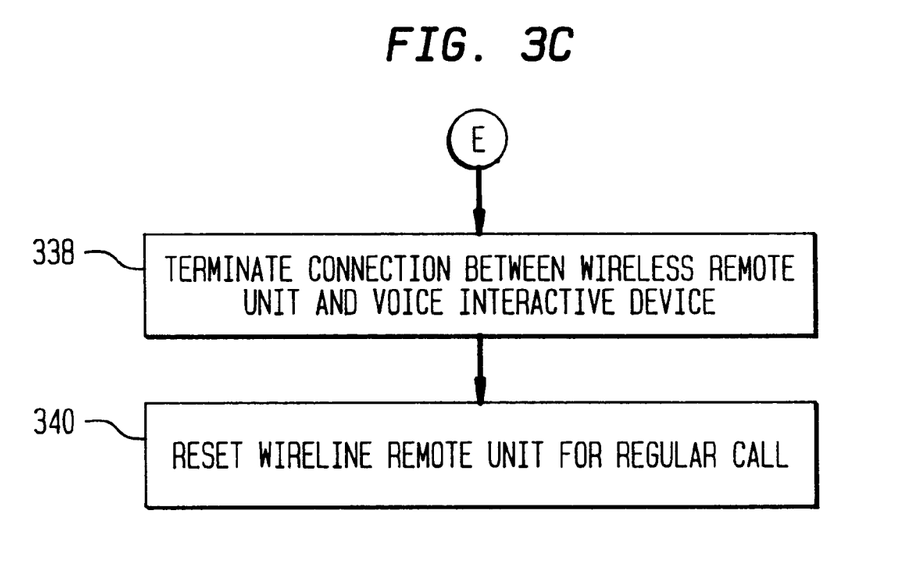

FIG. 3 shows adaptation of the method of FIG. 2 to an alternative embodiment utilizing DTMF tones rather than SMS messages. Many of the steps in FIG. 3 are the same as or similar to steps in FIG. 2, except for the DTMF-specific steps (e.g., steps 316, 318, 320, 322, 324, 326, 328, 330, 332, 334, 336 and 338). Thus, the discussion of some of the steps in FIG. 3 can be somewhat abbreviated because more extensive discussion has already been provided for corresponding steps in FIG. 2.

In step 300, central processor unit 24 of remote unit 20 detects activation of remote unit 20 by the user. At step 302, central processor unit 24 transmits a registration message from wireless transmitter/receiver 28 in order to register with wireless network 30.

If this is the initial activation, the wireless remote unit 20 at step 303 will derive the current date and/or time from control channel information of wireless network 30, and then store this value as the initial activation date in memory unit 26. The recordation of the initial activation date in memory 26 prevents prolonging of the warranty period.

In step 304, central processor unit 24 prompts a user input on user interface 22, for example, a Liquid Crystal Display ("LCD") or a speaker. User interface 22 displays or announces a warranty registration request to which the user responds, for example, by simply pressing one key to proceed with the registration process. Alternatively, user interface 22 may ask the user to input the user's name, address, phone number, the date and location of the remote unit 20 purchase, and other ancillary information. This information identifies the user of remote unit 20 and triggers the running of the warranty period.

In step 306, central processor unit 24 determines whether the user of remote unit 20 has responded positively, i.e., whether proper information has been input in response to the warranty information request. If not, central processor unit 24 in step 310 reprompts a user input on the user's next activation of remote unit 20. In step 311, central processor unit 24 resets remote unit 20 for a regular phone call.

If central processor unit 24 determines that the user has responded positively to the warranty registration request, central processor unit 24 in step 312 retrieves the warranty information that is pre-stored in memory 26 at the production facility.

In step 314, central processor unit 24 constructs an origination message containing necessary information to establish a connection to a voice-interactive device (such as the address of voice-interactive device 44), and utilizes wireless transmitter/receiver 28 to transmit the origination message to wireless network 30. In step 316, based on the origination message, a wireless connection is established between remote unit 20 and voice-interactive device 44.

In step 318, voice-interactive device 44 transmits a series of voice instructions to remote unit 20. The instructions may include, for example, an announcement, "Thank you for purchasing a Lucent Technologies™ cellular phone. Using the keypad, please type in your name and the date of purchase." In step 320, central processor unit 24 executes the instructions by utilizing user interface 22 and records the response of the user in memory 26.

In step 322, central processor unit 24 collects all the information (including pre-stored warranty information from memory 26, as well as the user response from step 320) and constructs a DTMF message. In step 324, central processor unit 24 addresses the DTMF message to be delivered to voice-interactive device 44 located in communication network 10. In step 326, central processor unit 26 transmits the DTMF message to voice-interactive device 44 via wireless network 30.

In step 328, message center server 46 retrieves from voice-interactive device 44 the DTMF message and decodes the DTMF tones into the warranty information. In step 330, message center server 46 determines whether the decoded warranty information is adequate to proceed with the warranty registration process. If not, message center 40 forwards a voice instruction to remote unit 20 requesting the user to re-enter appropriate information. For example, the voice message may announce: "There was an error. Please repeat registration."

If it is determined that all necessary information for the warranty registration process has been received, message center server 46 in step 334 either stores the warranty information in voice-interactive device 44 or transfers the warranty information to warranty storage center 60 via PSTN 50. If the warranty information is stored in voice-interactive device 44, warranty storage center server 62 may periodically access voice-interactive device 44 to download warranty information to warranty database 64.

In step 336, voice-interactive device 44 transmits an acknowledgment message to remote unit 20 so that the following announcement, for example, can be played at user interface 22: "Thank you for registering your phone with Lucent Technologies™." Central processor unit 24 in step 338 terminates connection between remote unit 20 and message center 40. In step 340, central processor unit 24 resets itself for a regular phone call to be made by the user.

The foregoing is merely illustrative of the principles of this invention and various modifications can be made by those skilled in the art without departing from the scope and spirit of the invention.

What is claimed is:

1. A method for registering a warranty for a wireless remote unit in a wireless communication network, said method comprising the steps of:

detecting an activation of said remote unit by a user, said detecting performed by said remote unit;

collecting warranty information specific to said remote unit in response to said detecting said activation of said remote unit by said user and in response to an information request generated at said remote unit;

encoding said warranty information into a warranty message; and transmitting said warranty message from said remote unit via said wireless communication network so as to register said warranty information.

2. The method of claim 1, wherein said warranty information includes a time of said activation of said remote unit.

3. The method of claim 1, wherein said warranty information includes pre-stored information specific to said remote unit.

4. The method of claim 1, wherein said collecting step comprises the steps of:

prompting a user input on a user interface of said remote unit during said activation;

receiving a user input in response to said prompting; and proceeding with said collecting step if said user input indicates user compliance with said prompting.

5. The method of claim 4, further comprising the step of:

reprompting a user input in response to a next activation of said remote unit if said user input received in said receiving step indicates user noncompliance with said prompting.

6. The method of claim 4, further comprising the steps of:

receiving user-added information responsive to said prompting; and encoding said user-added information into said warranty message.

7. The method of claim 1, further comprising the step of:
receiving an acknowledgment message indicating successful registration of said warranty information.

8. A method for registering a warranty in a wireless communication network, said wireless communication network comprising a message center having a message storage and a message server, comprising the steps of:
receiving a warranty message containing warranty information;
decoding said warranty information from said warranty message;
storing said warranty information in said message storage;
accessing said message storage by said message server periodically to retrieve said stored warranty information; and
transferring said retrieved warranty information so as to register said warranty information.

9. The method of claim 8, wherein said communication network comprises a warranty center, and wherein said method further comprises the step of:
storing said transferred warranty information in a warranty storage in said warranty center to register said warranty information.

10. The method of claim 9, further comprising the step of:
transmitting an acknowledgment message so as to indicate successful registration of said warranty information.

11. A method for registering a warranty for a wireless remote unit in a wireless communication network, said communication network having a message center, said method comprising the steps of:
detecting an activation of said remote unit by a user, said detecting performed by said remote unit;
collecting at said remote unit warranty information specific to said remote unit in response to said detecting said activation of said remote unit by said user and in response to an information request generated at said remote unit;
encoding at said remote unit said warranty information into a wireless message;
transmitting said wireless message from said remote unit to said message center via said wireless communication network;
receiving at said message center said wireless message; and
decoding at said message center said warranty information from said wireless message.

12. The method of claim 11, wherein said message center includes an interactive device, and wherein said method further comprises the steps of:

transmitting a registration instruction from said interactive device to said remote unit in response to said detecting;
receiving said registration instruction at said remote unit;
playing said registration instruction on a user interface of said remote unit; and
encoding a user response into said wireless message.

13. The method of claim 12, wherein said interactive device comprises a voice-interactive device.

14. The method of claim 11, wherein said communication network comprises a warranty center, and wherein said method further comprises the steps of:
transferring said warranty information to said warranty center; and
storing said warranty information in a warranty database in said warranty center to register said warranty information.

15. The method of claim 14, further comprising the steps of:
storing said warranty information in a mailbox located in said message center;
accessing said mailbox periodically to retrieve said stored warranty information; and
proceeding with said transferring step with said retrieved warranty information.

16. The method of claim 11, wherein said wireless message is a text message and said transmitting step employs an alphanumeric message link of said wireless communication network.

17. The method of claim 11, wherein said wireless message is a voice band tone message in a sequence of voice band tones and said transmitting step employs a voice band tone link of said wireless communication network.

18. The method of claim 11, wherein said message includes an image.

19. The method of claim 11, wherein said message includes video information.

20. The method of claim 11, further comprising the steps of:
deriving from said wireless communication network a time of said activation;
storing at a memory of said remote unit said activation time; and
including said activation time in said warranty information.

21. The method of claim 20, wherein said time includes a date of said activation.

* * * * *